United States Patent
Hatfield et al.

(10) Patent No.: US 6,184,285 B1
(45) Date of Patent: Feb. 6, 2001

(54) HOT MELT CONSTRUCTION ADHESIVES FOR DISPOSABLE ARTICLES

(75) Inventors: Stephen F. Hatfield, Lewisville; Alejandro Matassa, Southlake; Robert Goodman, Farmers Branch, all of TX (US)

(73) Assignee: Henkel Corporation, Gulph Mills, PA (US)

( * ) Notice: Under 35 U.S.C. 154(b), the term of this patent shall be extended for 0 days.

(21) Appl. No.: 09/185,965

(22) Filed: Nov. 5, 1998

Related U.S. Application Data

(60) Provisional application No. 60/067,529, filed on Dec. 4, 1997.

(51) Int. Cl.[7] ............ C08L 53/02; C08L 93/04; C08L 91/06; C09J 153/02; C08K 5/01

(52) U.S. Cl. .......... 524/505; 524/271; 524/274; 524/296; 524/306; 524/474; 524/484; 524/292; 524/485; 524/486; 524/487; 524/499; 525/99; 427/393.5; 156/334

(58) Field of Search .................. 524/271, 274, 524/296, 306, 474, 476, 484, 485, 486, 487, 489, 505, 392, 499; 525/89, 98, 99; 156/334; 427/393.5

(56) References Cited

U.S. PATENT DOCUMENTS

| | | | |
|---|---|---|---|
| 3,239,478 | 3/1966 | Harlan | 524/491 |
| 3,427,269 | 2/1969 | Davis et al. | 524/271 |
| 3,784,587 | 1/1974 | Chambers | 525/98 |
| 3,932,327 | 1/1976 | Naylor | 524/271 |
| 3,932,328 | 1/1976 | Korpman | 524/271 |
| 4,080,348 | 3/1978 | Korpman | 524/271 |
| 4,096,203 | 6/1978 | St. Clair | 524/505 |
| 4,104,327 * | 8/1978 | Inoue et al. | 525/595 |
| 4,125,665 | 11/1978 | Bemmels et al. | 428/352 |
| 4,136,699 | 1/1979 | Collins et al. | 428/355 BL |
| 4,212,910 | 7/1980 | Taylor et al. | 428/36.8 |
| 4,288,480 * | 9/1981 | Grzywinski et al. | 524/505 |
| 4,299,745 | 11/1981 | Godfrey | 524/488 |
| 4,325,770 | 4/1982 | Korpman | 156/230 |
| 4,460,728 | 7/1984 | Schmidt, Jr. et al. | 524/271 |
| 4,526,577 | 7/1985 | Schmidt, Jr. et al. | 604/366 |
| 4,835,200 | 5/1989 | St. Clair | 524/100 |
| 4,944,993 | 7/1990 | Raykovitz et al. | 428/290 |
| 5,024,667 | 6/1991 | Malcolm et al. | 604/382 |
| 5,037,411 | 8/1991 | Malcolm et al. | 604/358 |
| 5,057,571 | 10/1991 | Malcolm et al. | 524/505 |
| 5,077,120 * | 12/1991 | Kato et al. | 428/200 |
| 5,090,861 | 2/1992 | Malcolm et al. | 412/37 |
| 5,118,762 | 6/1992 | Chin | 525/314 |
| 5,143,968 | 9/1992 | Diehl et al. | 524/534 |
| 5,149,741 | 9/1992 | Alper et al. | 525/95 |
| 5,266,394 | 11/1993 | Diehl et al. | 428/261 |
| 5,275,589 | 1/1994 | Bozich | 604/373 |
| 5,290,842 * | 3/1994 | Sasaki et al. | 524/271 |
| 5,322,876 * | 6/1994 | Sasaki et al. | 525/89 |
| 5,401,792 | 3/1995 | Babu et al. | 524/270 |
| 5,498,646 | 3/1996 | Heuer et al. | 523/344 |
| 5,523,343 * | 6/1996 | Giordano et al. | 525/99 |
| 5,663,228 | 9/1997 | Sasaki et al. | 524/271 |
| 5,723,222 | 3/1998 | Sato et al. | 428/483 |
| 5,741,840 | 4/1998 | Lindquist et al. | 524/271 |
| 5,750,623 | 5/1998 | Diehl et al. | 525/98 |
| 5,856,387 | 1/1999 | Sasaki et al. | 524/271 |

FOREIGN PATENT DOCUMENTS

WO 96/11236  4/1996  (WO).

* cited by examiner

*Primary Examiner*—Peter A. Szekely
(74) *Attorney, Agent, or Firm*—Wayne C. Jaeschke; Stephen D. Harper

(57) ABSTRACT

Novel hot melt construction adhesives for disposable articles, such as diapers, sanitary napkins, medical gowns, surgical drapes, and the like, are described which offer superior properties versus currently available hot melt adhesives. These hot melt construction adhesive compositions comprise a blend of styrene-isoprene block copolymer containing at least about 25 weight percent styrene and styrene-butadiene block copolymer containing at least about 25 weight percent styrene, at least one compatible tackifying resin and at least one plasticizer. The hot melt construction adhesive possesses a viscosity no greater than about 25,000 mPa·s at about 140° C., a shear adhesion failure temperature of at least about 60° C., and a static shear time to failure of no less than about 25 hours at about 23°.

19 Claims, No Drawings

HOT MELT CONSTRUCTION ADHESIVES FOR DISPOSABLE ARTICLES

This application claims priority to U.S. Provisional Application Ser. No. 60/067,529 filed on Dec. 4, 1997.

FIELD OF THE INVENTION

This invention relates to new hot melt construction adhesives for the manufacture of disposable consumer articles, such as diapers, feminine sanitary napkins, adult incontinent products, medical gowns, and the like.

BACKGROUND OF THE INVENTION

The development of hot melt construction adhesives for disposable consumer articles has paralleled the increasing complexity of the articles themselves. The increasing complexity of disposable articles requires hot melt construction adhesives to bond to a wider range of substrates such as various nonwoven materials and low surface energy polyolefins such as untreated polypropylene. The use of thinner polyolefin back sheets in the manufacture of disposable articles requires the use of lower viscosity hot melts in order to prevent burn-through and distortion when the adhesive is applied. Highly creep resistant bonds are required to hold elastic attachments in place, for example, elastic attachments made from natural rubber, polyurethane, and various types of foam. In addition, restrictions on low odor and light color of the hot melts are needed to meet consumer expectations.

Hot melt construction adhesives for disposable articles are known, including ethylene-vinyl acetate (EVA) copolymer-based hot melts, amorphous polypropylene-alpha-olefin (APAO)-based hot melts, styrene-butadiene-styrene (SBS) A-B-A-B-A multi-block copolymer-based hot melts, styrene-butadiene-styrene $(SB)_n$ radial copolymer-based hot melts, and styrene-isoprene-styrene (SIS) A-B-A block copolymer-based hot melts.

EVA copolymer-based hot melts such as those disclosed in U.S. Pat. No. 4,299,475 suffer from poor adhesion to polyolefins and require large add-ons to obtain sufficient bond strengths.

APAO-based hot melts such as those disclosed in U.S. Pat. No. 4,460,728 lack specific adhesion to polyolefins and exhibit poor creep resistance and poor machinability.

SBS multi-block copolymer-based hot melts such as those disclosed in U.S. Pat. No. 4,526,577 possess poor specific adhesion to foam elastic attachments used in leg gathers and waist bands on diapers and adult incontinent articles and inferior creep resistance (particularly noticeable at low temperatures which articles are commonly exposed to during shipment and storage). Furthermore, SBS multi-block copolymer-based hot melts exhibit thermal stability problems; i.e., when they are subjected to heating during the article manufacturing process, these hot melts have a tendency to gel and plug the application equipment.

Hot melt construction adhesives based on styrene-butadiene-styrene $(SB)_n$ radial copolymers such as those disclosed in U.S. Pat. Nos. 4,944,933, 5,024,667, 5,037,411 and 5,057,571 suffer from poor machining and adhesion limitations which result in inferior bonds to polyolefin substrates. In addition, these formulations are highly over-tackified to provide necessary creep resistance, which in turn renders the adhesives very stiff at low temperatures and thus yields inferior bond strengths at those low temperatures. Radial polymers, while inherently stronger than multi-block copolymers, do not exhibit desirable adhesion characteristics, mainly due to the positioning of the styrene domains. Multi-block copolymers have more mid-block ends extending away from the styrene domains. Since the mid block dictates the adhesive properties of these hot melts, polymers possessing more mid-block ends tend to exhibit better adhesion characteristics.

Hot melt construction adhesives based on styrene-isoprene-styrene A-B-A block copolymers such as those disclosed in U.S. Pat. No. 5,149,741 possessing high amounts of styrene, without styrene endblock modifying resins, suffer from a loss of creep and heat resistance upon long exposure to high temperatures. SIS copolymers undergo chain scission reactions which form large amounts of styrene-isoprene (SI) diblocks. This causes a loss in mechanical properties which manifests itself in dramatic decreases in viscosity, lower heat resistance, lower shear adhesion failure temperature, and lower creep resistance as indicated by a shorter time to failure during static shear at both room temperature and elevated temperature. Furthermore, these compositions are highly over-tackified, thus deleteriously impacting their low temperature adhesion.

Non-pressure sensitive hot melt adhesives based on A-B-A styrene-butadiene-styrene copolymers, A-B-A-B-A styrene-butadiene-styrene copolymers, and their hydrogenated counterparts (styrene content 15 to 60%) such as those disclosed in U.S. Pat. No. 5,275,589 are specifically designed to bond to the outer nonwoven layer of three ply diaper construction and are high viscosity oil-less formulations.

Sprayable hot melt adhesives based on blends of styrenic block copolymers (12 to 45% styrene by weight), tackifying resins, and ethylene copolymers such as ethylene-methacrylate copolymers such as those disclosed in U.S. Pat. No. 5,401,792 are well known in the industry to be highly unstable systems, which can cause equipment problems due to gelation upon overexposure to high temperature.

Pressure sensitive, low tack hot melt adhesive compositions containing styrene-butadiene radial block copolymers, styrene-isoprene radial block copolymers and/or styrene-isoprene linear block copolymers, and plasticizing oils, such as those disclosed in U.S. Pat. No. 5,523,343, exhibit a good balance of properties normally required. However, these hot melt adhesive compositions possess very low tack values (i.e., peel adhesion and quick stick) and are very high in viscosity. Accordingly, they are not viable adhesives for disposable article construction applications which require high tack valves and low viscosities at 140° C., i.e., <25,000 mPa·s.

SUMMARY OF THE INVENTION

It is an object of the present invention to provide a hot melt construction adhesive for disposable consumer articles which exhibits low viscosity.

It is a further object of the present invention to provide a hot melt construction adhesive for disposable consumer articles which exhibits improved creep resistance, improved high temperature resistance, improved thermal stability, and improved adhesion to polyolefins such as high-density polyethylene both at elevated and at low temperatures.

These and further objects of the invention are obtained by a hot melt construction adhesive composition which comprises a blend of a styrene-butadiene (SB) block copolymer containing greater than about 25 weight percent styrene and a styrene-isoprene (SI) block copolymer containing greater than about 25 weight percent styrene, said hot melt construction adhesive composition possessing a viscosity of no greater than about 25,000 mPa·s at about 140° C., a shear adhesion failure temperature (SAFT) of at least about 60° C. and a static shear time to failure of no less than about 25 hours at about 23° C., i.e., at room temperature. The hot melt construction adhesive of this invention further comprises tackifying resin(s) and plasticizing oil(s) and optionally can further comprise stabilizer(s) and wax component(s).

All quantities disclosed herein, except in the examples are to be understood to be modified by the term "about".

DESCRIPTION OF THE PREFERRED EMBODIMENTS

The hot melt construction adhesive of the invention contains, as its primary component, a blend of a styrene-butadiene block copolymer containing at least about 25 weight percent styrene and a styrene-isoprene block copolymer containing at least about 25 weight percent styrene. The styrene-butadiene block copolymer can broadly represent from about 5 to about 20, preferably from about 8 to about 16, weight percent of the hot melt adhesive of this invention. The styrene-isoprene block copolymer can broadly represent from about 5 to about 20, preferably from about 8 to about 16, weight percent of the hot melt adhesive of this invention. The styrene-butadiene and styrene-isoprene block copolymers can be linear copolymers corresponding to the general configuration A-B-A or A-B-A-B-A or radial copolymers corresponding to the general configuration $(AB-)_n$ wherein the polymer blocks A are non-elastomeric styrene-containing polymer blocks, and the polymer blocks B are elastomeric butadiene-containing or isoprene-containing polymer blocks. The use of linear styrene-butadiene block copolymers is particularly preferred for use herein. The styrene-butadiene block copolymer and styrene-isoprene block copolymer are individually comprised of at least about 25 weight percent, preferably from about 25 to about 50, and more preferably from about 35 to about 45, weight percent styrene. The styrene-butadiene block copolymer and the styrene-isoprene block copolymer each individually possess a melt flow index of from about 3 to about 50, preferably from about 8 to about 40 (as determined by ASTM-D 1238-95). The ratio of butadiene-isoprene block copolymer to styrene-isoprene block copolymer employed to produce the physical blend can broadly range from about 1:3 to about 3:1 parts by weight and preferably is about 1:1.

Typical styrene-butadiene copolymers which can be advantageously employed in the present invention include the linear A-B-A triblock styrene-butadiene copolymers sold under the tradenames Kraton D-1102 by Shell-Chemical or SolT166 by Enichem, the linear A-B-A-B-A multiblock styrene-butadiene block copolymers sold under the tradenames Stereon 840A by Firestone or Vector D-4461 by Dexco and the radial $(AB-)_n$ styrene butadiene copolymers sold under the tradename Kraton D-1122X by Shell Chemical or SolT168 by Enichem. Typical styrene-isoprene copolymers which can advantageously be employed herein are the styrene-isoprene copolymers sold under the tradenames Vector 4411D by Dexco or SolT193A, SolT193B and SolTE-9308 by Enichem. In addition to high styrene content, the di-block content of the styrene-isoprene copolymers is advantageously maintained below 25 weight percent, more preferably below 10 weight percent and most preferably 0 weight percent due to their poor thermal stability (which leads to di-block formation and a loss of creep and heat resistance).

Most preferred for use herein are blends of the linear A-B-A-B-A multiblock styrene-butadiene block copolymer sold by Firestone under the tradename Stereon 840A and the linear A-B-A triblock styrene-isoprene copolymer having di-block content of 0 weight percent sold by Dexco under the tradename Vector 4411D.

The tackifying resin(s) which are employed in the hot melt construction adhesives of the present invention are those which extend the adhesive properties and improve specific adhesion characteristics of the adhesives. As used herein, the term "tackifying resin" includes, but is not limited to, natural and modified rosins such as gum rosin, wood rosin, tall-oil rosin, distilled rosin, hydrogenated rosin, dimerized rosin and polymerized rosin; glycerol and pentaerythritol esters of natural and modified rosins, such as the glycerol esters of pale wood rosin, hydrogenated rosin, polymerized rosin and the pentaerythritol ester of pale wood rosin, hydrogenated rosin, tall oil rosin and the phenolic-modified pentaerythritol ester of rosin; polyterpene resins having a softening point, as determined by ASTM method E28-58T, of from about 60° C. to about 140° C., the latter polyterpene resins generally resulting from the polymerization of terpene hydrocarbons, such as the mono-terpene known as pinene, in the presence of Friedel-Crafts catalysts at moderately low temperatures; also included are the hydrogenated polyterpene resins; copolymers and terpolymers of natural terpenes, e.g., styrene/terpene, α-methyl styrene/terpene and vinyl toluene/terpene; phenolic-modified terpene resins such as, for example, the resin product resulting from the condensation, in an acidic medium, of a terpene and a phenol; aliphatic petroleum hydrocarbon resins having Ball and Ring softening points of from about 60° to 140° C., the latter resins resulting from the polymerization of monomers consisting primarily of olefins and diolefins; also included are the hydrogenated aliphatic petroleum hydrocarbon resins; aromatic petroleum hydrocarbons and the hydrogenated derivatives thereof, aliphatic-/aromatic petroleum derived hydrocarbons and the hydrogenated derivatives thereof. Mixtures of two or more of the above described tackifying resins can be employed where desired. Tackifying resins can broadly represent from about 40 to about 65 parts by weight of the hot melt adhesive of this invention and preferably represent from about 50 to 60 parts by weight of the hot melt adhesive of this invention.

The preferred tackifying resins for the present invention are aliphatic/aromatic petroleum derived hydrocarbon resins having softening points from about 60° C. to about 130° C. Commercially available resins of this type are supplied by Exxon under the tradename Escorez 5600 and by Hercules under the tradename Regalite V1100. These resins offer excellent compatibility with blends of styrene-isoprene and styrene-butadiene block copolymers without the need of co-tackifying resins. Their light color and low odor make them ideal for consumer article construction applications. These resins have softening points from about 90° C. to about 110° C.

The plasticizer(s) which are utilized in the hot melt adhesive of the present invention provide viscosity control and wetting and specific adhesion to bonded substrates. These plasticizers are selected from a group consisting of naphthenic oil, phthalate and adipate esters, oligomers of polypropylene, polybutenes, polyisoprene, hydrogenated polyisoprene and polybutadiene, benzoate esters, and vegetable and animal oils and derivatives thereof and mixtures of two or more of any of the foregoing. The preferred primary plasticizer is a paraffinic oil, a commercial grade widely used is available from Witco under the tradename Kaydol oil. Plasticizers can broadly represent from about 10 to about 30 parts by weight of the hot melt adhesive of this invention and preferably represent from about 15 to about 25 parts by weight of the hot melt adhesive of this invention.

Wax component(s) can be optionally utilized in the present invention. Wax components are useful for multipurpose hot melt adhesives, in that these components offer additional wetting and added creep resistance for foamed elastic attachments. These wax additives can be selected from a group comprised of paraffin wax, microcrystalline wax, Fischer-Tropsch wax, polyethylene wax, ethylene vinyl acetate wax, oxidized polyethylene wax, hydrogenated castor oil and derivatives thereof, polypropylene wax and mixtures of two or more of any of the foregoing. The preferred waxes for the present invention are selected from a group of oxidized polyethylene waxes, of which a commercial grade is available from Allied Signal under the tradename AC-395. Wax component(s) can represent from 0 to about 10 parts by weight of the hot melt adhesive of this invention and preferably represent from about 3 to about 7 parts by weight of the hot melt adhesive of this invention.

Stabilizers can be optionally utilized in the present invention, such as high molecular weight hindered phenols and multifunctional phenols. Hindered phenols are well known to those skilled in the art to be effective primary stabilizers for both styrene-isoprene block copolymers and styrene-butadiene block copolymers. Typical commercially available stabilizers of these types are supplied by Ciba-Geigy under the tradenames Irganox 1010 and Irganox 1076. Useful secondary stabilizers include phosphites, such as tris-(p-nonylphenyl)-phosphite (TNPP) and bis(2,4-di-tert-butylphenyl)4,4'-diphenylene-diphosphonite and di-stearyl-3,3'-thiodipropionate (DSTDP). Stabilizer(s) can represent from 0 to about 2.0, preferably from about 0.25 to about 2.0, parts by weight of the hot melt adhesive of this invention.

The hot melt adhesive composition of this invention is prepared by mixing the components in a heated tank under vacuum at a temperature of from about 120° C. to about 190° C. until a homogeneous blend is obtained. A minimal amount of thermal and mechanical energy should be employed to manufacture the adhesive. The determination of such amounts are well within the purview of one skilled in the art. This step usually requires two to three hours. The vacuum is then broken with nitrogen or carbon dioxide gas to prevent air entrapment in the adhesive. The finished adhesive is then packed and cooled quickly for shipment to the manufacturer of the disposable articles.

The disposable article manufacturer then re-melts the hot melt adhesive for use as the construction adhesives of said articles. The application of the hot melt construction adhesives may be accomplished by several applications systems depending on the type of article being made and the substrates involved. These application systems may involve spiral spray techniques, multi-line extrusion, multi-dot extrusion, and melt blown deposition. The adhesives produced by the teachings of the present invention can be applied by any of the aforementioned techniques in the manufacture of consumer articles, and wherein the adhesive is bonding a polyolefin or nonwoven substrate to at least one elastic, polyolefin, foam, or nonwoven substrate.

This invention can be further illustrated by the following examples of the preferred embodiments thereof, although it will be understood that these examples are included only for illustration and comparison to the existing art, and are not intended to limit the scope of the invention unless specifically indicated.

EXAMPLES 1–3

Hot melt adhesive compositions in accordance with the teachings of the present invention (Examples 1–3) were prepared by blending styrene-butadiene and styrene-isoprene block copolymers, plasticizer (Kaydol Oil available from Witco) and stabilizer (Irganox 1010 available from Ciba-Geigy) in a heated vessel at 177° C. under high shear from a marine type prop mixer. Once this blend was homogeneous, the tackifying resin (Escorez 5600 available from Exxon) was added slowly until a uniform mixture was obtained. The resulting adhesive was tested for viscosity, (RBSP), and then coated 25 microns thick on a 50 micron PET film using an Acumeter slot-die coater at 140° C. The resulting 25-micron films of adhesive were then tested for comparison to Comparative Examples 1–4.

Example 1 was made from a 1:1 blend of a SBS multi-block A-B-A-B-A copolymer (43% styrene, 12 MFI) (Stereon 840A) and a SIS tri-block A-B-A type copolymer (no diblock, 40 MFI) (Vector 4411D). This example represents a typical formulation based on the teachings of this invention using a linear multi-block SBS copolymer blended with a linear tri-block SIS copolymer.

Example 2 was made from a 1:1 blend of a SBS $(AB)_n$ radial copolymer (39% styrene, 3 MFI) (Kraton D-1122X) and a SIS A-B-A tri-block copolymer (25% styrene, 25% SI diblock, 8 MFI), (Sol T-193B). This example represents a typical formulation based on the teachings of this invention using a radial SBS copolymer blended with a tri-block SIS copolymer.

Example 3 was made from a 1:1 blend of a SBS $(AB)_n$ radial copolymer (39% styrene, 3MFI) (Kraton D-1122X) and a SIS A-B-A copolymer (30% styrene no diblock, 7 MFI) (Sol TE-9308). This example represents a typical hot melt composition based on the teachings of this invention in which the polymer blend is comprised of a 1:1 ratio of a high styrene radial $(SB)_n$ copolymer and a high styrene, SIS triblock copolymer with no diblock.

COMPARATIVE EXAMPLE 1

A hot melt adhesive composition in accordance with the teaching of U.S. Pat. No. 4,526,577 was prepared and tested according to the procedure outlined in Example 1. Comparative Example 1 is based on a linear SBS multi-block A-B-A-B-A copolymer (43% styrene, 12 MFI) (Stereon 840A).

COMPARATIVE EXAMPLE 2

A hot melt adhesive composition in accordance with the teaching of U.S. Pat. No. 5,057,571 was prepared and tested according to the procedure outlined in Example 1, with one exception: the polymer-Kraton D-1184 was pre-swelled with the Kaydol oil and Irganox 1010 overnight at 140° F. to allow for incorporation due to its high molecular weight. Without pre-swelling the polymer midblock, we were unable to incorporate this polymer without severe discoloration and degradation of the polymer. The polymer blend of Comparative Example 2 is made from a branched SBS (Kraton D-1184) (31% styrene, <1 MFI) and low styrene, high diblock SIS, (Kraton D-1117) (17% styrene, 35% diblock, 33 MFI) in a ratio of SIS:SBS of 1:1.86.

COMPARATIVE EXAMPLE 3

A hot melt adhesive composition in accordance with the teachings of U.S. Pat. No. 5,149,741 was prepared and tested according to the procedure outlined in Example 1. Comparative Example 3 is based on a 25% styrene SIS, A-B-A copolymer (25% diblock, 8 MFI) (Sol T-193B).

COMPARATIVE EXAMPLE 4

A hot melt adhesive composition outside of the teachings of the present invention was prepared and tested according to the procedure outlined in Example 1.

Comparative Example 4 represents a formulation based on a blend of a high styrene, 43% styrene, A-B-A-B-A multi-block styrene butadiene copolymer (12 MFI) (Stereon 840A) and a low styrene, 15% styrene, SIS A-B-A tri-block copolymer (19% diblock, 11 MFI) (Kraton D-1107).

The compositions of Examples 1–3 and Comparative Examples 1–4 are presented in Table I below.

TABLE I

| | Example 1 | Example 2 | Example 3 | Comparative Example 1 | Comparative Example 2 | Comparative Example 3 | Comparative Example 4 |
|---|---|---|---|---|---|---|---|
| STEREON 840A | 11.0 | | | 20.0 | | | 11.0 |
| VECTOR 4411D | 11.0 | | | | | | |
| KRATON D-1107 | | | | | | | 9.0 |
| KRATON D-1184 | | | | | 9.12 | | |
| KRATON D-1117 | | | | | 4.9 | | |
| KRATON D-1122X | | 10.0 | 10.0 | | | 10.0 | |
| SOL TE-9308 | | | 10.0 | | | 10.0 | |
| SOLT-193B | | 10.0 | | | | | |
| IRGANOX 1010 | 0.5 | 0.5 | 0.5 | 0.5 | 0.5 | 0.5 | 0.5 |
| KAYDOL OIL | 20.0 | 22.0 | 22.0 | 20.0 | 19.4 | 22.0 | 22.0 |
| EXCOREZ 5600 | 57.5 | 57.5 | 57.5 | | | 57.5 | 57.5 |
| ZONATAC M-105 | | | | 59.5 | | | |
| ZONATAC 501 | | | | | 13.18 | | |
| PETROLYT E-1040 | | | | | 3.0 | | |
| UNITAC R-100 | | | | | 49.9 | | |

All values are in percent by weight

Examples 1–3 and Comparative Examples 1–4 were evaluated using the following test methods:

Test Methods

1) Viscosity

Purpose:
This method is designed to determine the molten viscosity of hot melt adhesives at specified temperatures.

Reference:
This method is similar to ASTM-D 3236-88

Equipment:
1) Viscometer—Brookfield RVT
2) Spindles—Stainless Steel
   a. SC 4-21
   b. SC 4-27
   c. SC 4-28
   d. SC 4-29
1) Sample Chamber—with temp. controller providing accuracy of ±1.0° C. or better through temperature range of at least 100° C. to 200° C.
2) Various Brookfield accessories (i.e. Extracting tool, viscometer stand, Ceramic chamber cover, etc.)

Sample:
1) Hot melt adhesive cut into strips small enough to fit into the sample chamber.

Procedure:
1) Preheat Thermo-cell to desired temperature.
2) Estimate approximate viscosity of sample.
3) Based on this estimate, select spindle from Table A.
4) Weigh out amount of sample indicated in Table A for the spindle.
5) Place sample in Thermo-cell Chamber and allow to melt.
6) Insert spindle, lower viscometer into position, level Thermo-cell and viscometer then cover chamber.
7) Turn on motor and adjust speed to maintain reading between 20 and 80.
8) Monitor viscosity until Thermo-cell temperature equilibrates and reading stabilizes—approximately 20 minutes.
9) Record Spindle, Speed, Temperature and Viscometer readout.
10) Calculate viscosity by multiplying readout by the spindle/speed factor from Table B.

Report:
Report Viscosity in mPa·s at test temperature.

TABLE A

| Viscosity Range (mPa · s) | Spindle | Sample weight (grams) |
|---|---|---|
| 0–5,000 | SC 4-21 | 8.0 |
| 5,000–10,000 | SC 4-27 | 10.5 |
| 10,000–60,000 | SC 4-28 | 11.0 |
| 60,000–100,000 | SC 4-29 | 13.0 |

TABLE B

| Speed (RPM) | SC 4-21 | SC 4-27 | SC 4-29 | SC 4-29 |
|---|---|---|---|---|
| 100 | 5 | 25 | 50 | 100 |
| 50 | 10 | 50 | 100 | 200 |
| 20 | 25 | 125 | 250 | 500 |
| 10 | 50 | 250 | 500 | 1K |
| 5 | 100 | 500 | 1K | 2K |
| 2.5 | 200 | 1K | 2K | 4K |
| 1 | 500 | 2.5K | 5KJ | 10K |
| 0.5 | 1K | 5K | 10K | 20K |

2) Ring and Ball Softening Point (RBSP)

Purpose:
This method is designed to determine the softening point of hot melt adhesives.

Reference:
  This method is similar to ASTM-E 28-67.
Equipment:
1) Ring and ball apparatus conforming to ASTM-E 28-67 FIG. 1(d)
   a. Ring.
   b. Ball—3.51 grams±0.02 grams
   c. Ball-Centering Guide.
   d. Thermometer—min. rang 40° C. to 200° C. in 1 degree increments.
   e. Container—1000 ml Pyrex beaker.
   f. Support for ring and thermometer.
Sample:
1) Place two rings with shoulder side up on a suitable surface.
2) Pour molten adhesive into ring with a small amount of excess.
3) Allow the adhesive to cool before moving.
4) Condition samples at least 24 hours in standard conditions.
5) Remove excess adhesive flush with ring.
Procedure:
1) Fill container with 700 ml of Glycerin and add magnetic stirrer.
2) Place sample rings into position in support apparatus.
3) Place ring-centering apparatus over sample rings.
4) Place balls in center of rings.
5) Insert thermometer into support apparatus so that bottom of bulb is level with bottom of rings.
6) Submerge assembled apparatus in glycerin.
7) Heat glycerin a rate of 5° C. per minute while stirring.
8) Record temperature at which the material touches the horizontal plate 2.54 cm below the sample rings.
9) Take average of 2 samples.
Report:
  Report average temperature in ° C.

3) Shear Adhesion Failure Temperature (SAFT)

Purpose:
  This method is designed to test the heat resistance of hot melt adhesives in shear mode.
Reference:
  This method is similar to ASTM-D 4498-85.
Equipment:
1) 50 micron Mylar® film.
2) Release paper.
3) 5 cm×7.5 cm SS plates.
4) 5 cm×7.5 cm HDPE plates.
5) Acumeter 5 cm laboratory coater.
6) Roll down device with 2 kg rollers.
7) 500 g weights.
8) Clamping devices for suspending the samples and weights in the oven.
9) Forced ventilation oven. Programmable controller optional.
Sample:
1) Samples shall be coated onto 50 micron Mylar® film at 25 microns coat weight ±3 microns and nipped with release paper.
2) Test samples shall be conditioned for at least 24 hours in standard conditions.
Procedure:
1) Cut 2.5 cm×7.5 cm strips from the coated stock.
2) Clean panel three times. First wipe gross adhesive with a suitable solvent and a lint free towel (Suitable solvents are Toluene, n-Heptane, MEK). Repeat cleaning with new towel and Methanol. Then clean any residue with a clean towel and Hexane.
3) Place one end of the strip on a panel so that 2.5 cm overlap. This should result in a 2.5 cm×2.5 cm bonded area.
4) Place sample in the roll down device and roll sample down the plate with one forward and one backward pass at 30 cm per minute.
5) Use 500 gram weights.
6) Set initial oven temperature to 32° C.
7) Hang three (3) samples from suitable clamps in the oven.
8) Place weights and weight clamps in the oven and allow all apparatus to equilibrate.
9) Hang weights onto samples so that a shear configuration is obtained.
10) For manual oven, increase temperature 5.5° C. within 2 minutes and then soak for 10 minutes and repeat until all samples fail.
11) For programmable oven, set ramp at 33.3° C./hour.
12) Record temperature of each sample's failure.
Report:
1) Report material of substrate panel.
2) Report average of three samples in ° C.

4) 180° Peel

Purpose:
  This method is designed to test the adhesion of pressure sensitive adhesives to stainless steel (55) panels or HDPE panels.
Reference:
  This method is similar to PSTC and ASTM-D 3330.
Equipment:
1) Instron, model 1000.
2) 50 micron Mylar® film.
3) Release paper.
4) Acumeter 5 cm laboratory coater.
5) Roll down device with 2 kg rollers.
6) 5 cm×15 cm Stainless steel panels.
7) 5 cm×15 cm HDPE panels.
Sample:
1) Samples shall be coated onto 50 micron Mylar® film at 25 micron coat weight ±3 micron and nipped with release paper.
2) Test samples shall be 2.5 cm wide and approximately 20 cm long.
3) Test samples shall be conditioned for at least 24 hours in standard conditions.
Procedure:
1) Clean panel three times. First wipe gross adhesive with a suitable solvent and a lint free towel (Suitable solvents are Toluene, n-Heptane, MEK). Repeat cleaning with new towel and Methanol. Then clean any residue with a clean towel and Hexane.
2) Set up Instron to track tension in the anticipated range and adjust to zero. Set crosshead speed to 30 cm/min. Set up chart recorder to appropriate range and adjust zero.
3) Remove release paper backing from one end of test strip and touch to one end of panel. Roll strip down to panel using only the weight of the roller and moving at a rate of 30 cm/min. At the same rate, roll the roller backward to the start and off.
4) Test sample immediately—within one minute. Fold back the free end of the strip and peeling approximately 2.5 cm from the panel. Clamp that end of the panel to the lower jaw of the Instron. Clamp the free end of the test strip to the upper jaw. Start the upper jaw in motion. Disregard the values obtained from the first 2.5 cm of peel. Use the average force value obtained during the next 5 to 8 cm as the adhesion force.

Report:
1) Report material of substrate panel.
2) Report the peel adhesion force in g/cm (width).

5) Static Shear Time to Failure

Purpose:
This method is designed to test the creep resistance of hot melt adhesives in shear mode.
Reference:
This method is similar to ASTM-D 2294 and PSTC-7.
Equipment:
1) Acumeter lab coater.
2) 50 micron Mylar®.
3) Release paper.
4) Roll down device with 2 kg rollers.
5) Environmental chamber (for non-standard conditions testing).
6) 500 g weights.
7) 5 cm×7.5 cm Stainless steel panels.
8) 5 cm×7.5 cm HDPE panels.
9) Automatic timing device monitoring vertical sample panels supported over horizontal panels with limit switches under them.
10) Clamping devices for suspending the samples and weights.
Sample:
1) Samples shall be coated onto 50 micron Mylar® film at 25 micron coat weight ±3 micron.
2) Test strips shall be 2.5 cm wide and approximately 7.5 cm long.
3) Test samples shall be conditioned for hours in standard conditions.
Procedure:
1) If non-standard conditions are called for in the test, condition entire apparatus and weights for one hour prior to testing.
2) Clean panels three times. First wipe gross adhesive with a suitable solvent and a lint free towel (Suitable solvents are Toluene, n-Heptane, MEK). Repeat cleaning with new towel and Methanol. Then clean any residue with a clean towel and Hexane.
3) Randomly select three test strips. Roll a 2.5 cm by 2.5 cm square down to the panel using only the weight of the roller and moving at a rate of 30 cm/min. At the same rate, roll the roller backward to the start and off. Suspend the samples in the timing device by clamping the panel to the device.
4) Condition entire apparatus, including samples, to test conditions for 10 minutes.
5) Gently attach a 500 gram weight to the bottom of sample so that a shear configuration is obtained.
6) Monitor bonds until all samples fail and note time to failure for each sample.
7) Take average of 3 samples.
Report:
1) Report test temperature and type of substrate panel.
2) Report average of three samples in minutes.

6) Static Shear Time to Failure

Purpose:
This method is designed to evaluate an adhesive's relative adhesion to high density polyethylene at low temperatures.
Equipment:
1) 50 micron Mylar film.
2) Release paper.
3) 5 cm×12 cm HDPE panels.
4) Acumeter 5 cm laboratory coater.
5) Roll down device with 2 kg rollers.
6) Refrigerated cabinet maintained at 4° C.

Sample:
1) Samples shall be coated onto 50 micron Mylar® film at 25 microns coating thickness ±3 microns and nipped with release paper.
2) Test samples shall be conditioned for at least 24 hours at standard conditions.
Procedure:
1) Cut 2.5 cm×20 cm strips from coated stock.
2) Clean panels three times. First wipe gross adhesive with a suitable solvent and a lint free towel (suitable solvents are Toluene, n-Heptane, MEK). Repeat cleaning with new towel and methanol. Then clean any residue with a fresh towel and Hexane.
3) Remove release paper backing from one end of the test strip and touch to one end of the test panel. Roll strip down to panel using only the weight of the roller and moving at a rate of 30 cm/min. At the same rate, roll the roller backward to the starting position and remove the panel.
4) Condition the test samples for one hour after roll down at standard conditions.
5) Place test samples in refrigerated cabinet at 4° C. for 16 hours.
6) After the 16 hour exposure to 4° C., slowly peel each sample while it is in the cabinet to check for adhesion to the HDPE panel.
7) Test three specimens of each sample and report average result.
Report:
1) Report the substrate material.
2) Report the relative degree of adhesion to the substrate, excellent—being the best, very good—next, good, fair, and poor being the worst (little or no adhesion).

7) Melt Flow Index (MFI)

Purpose:
This method is designed to determine the relative viscosity of thermoplastic polymers (MFI is related to the molecular weight and structure of a polymer).
Reference
This method is similar to ASTM-D 1238-95.
Apparatus:
The apparatus shall be a dead-weight piston plastometer consisting of a thermostatically controlled heated steel cylinder with a die at the lower end and a weighted piston operating within the cylinder. Detailed description of individual components can be found in ASTM-D 1238-95.
Procedure:
Manual operation with condition 190/5.
1) Check die bore diameter with appropriately sized go/no-go gages prior to testing. Die should be tested at 25±5° C.
2) Allow the apparatus, including die and piston to equilibrate at 190±0.2° C. for 15 minutes prior to testing.
3) Remove the piston and place it on an insulated surface. Charge the cylinder within 1 minute with a weighted portion of the sample according to the expected flow rate, as given in Table 1.
4) Replace the piston and allow time for the material to begin to melt. Normally about 5 to 6 minutes.
5) Add 5 Kg weight to piston and purge air along with some material until piston start marks are still 1.5 to 2 cm from top of cylinder. Then allow time for piston to fall naturally to the start marks.
6) Start collecting a timed extrudate when the piston start mark reaches the top of the cylinder as long as the total time from the end of the charging step has not exceeded 7 minutes.
7) Simultaneously start the interval timer, (time set according to Table 1,) and make the initial cut-off when the start mark reaches the cylinder.
8) Make the final cut-off when the time interval is reached. Check the extrudate for air bubbles and discard if any are found.

9) Purge the remainder of the material and clean the apparatus.
10) Upon cooling, weight the extrudate to the nearest 1 mg.
11) Multiply the weight by the appropriate factor from Table 1 to obtain the flow rate in grams per 10 minutes.
12) Repeat steps 2 through 11) for at least three good readings.

Report:
1) Condition used.
2) Average of three samples in g/10 min.

8) Specification of Standard Atmospheres for Conditioning and Testing

Purpose:
This specification defines standard conditions for normal ambient conditioning of materials.

Reference:
This specification is similar to ASTM-E 171-87.

Specification:
Standard atmosphere for conditioning and testing of materials shall have a temperature of 23° C.±2° C. and a relative humidity of 50%±5%.

Test Results

Table II below summarizes the results of the testing conducted on Examples 1–3 and Comparative Examples 1–4.

SAFT is an important test for determining storage of adhesive bonds under a static load under elevated temperatures, such as those encountered during the shipment of finished disposable articles. The examples of this invention possess superior high temperature properties (as evidenced by the SAFT and static shear results) and superior adhesion to HDPE at 4° C. The static shear properties are especially greater for Example 1 versus any of Comparative Examples 1–4. Even Example 3, which was formulated to be lower in viscosity compared to Examples 1–2, has comparable properties versus the comparative examples. Lower viscosity hot melts are beneficial for bonding thinner polyolefin films to nonwovens for the manufacture of disposable articles, without distortion of the substrates.

Concerning property retention after exposure to elevated temperatures, the adhesives of this invention overcome the limitations of both styrene-isoprene and styrene-butadiene copolymers by blending them. This blend provides a more stable adhesive versus an adhesive formulated with either copolymer alone. Styrene-isoprene copolymer-based adhesives undergo chain scission, which lowers the molecular weight of the copolymer and weakens the adhesive, resulting in lower heat and shear resistance. Adhesives formulated with styrene-butadiene copolymers undergo chain extensions during exposure to elevated temperature which leads to the gelation of the adhesive that can plug application equipment.

TABLE II

| Test | Example 1 | Example 2 | Example 3 | Comparative Example 1 | Comparative Example 2 | Comparative Example 3 | Comparative Example 4 |
| --- | --- | --- | --- | --- | --- | --- | --- |
| Viscosity at 135° C. (mPa · s) | 5,125 | 3,875 | 2,750 | 5,700 | 5,250 | 7,250 | 5,000 |
| Viscosity at 149° C. (mPa · s) | 2,500 | 2,100 | 1,450 | 3,000 | 2,700 | 3,850 | 2,900 |
| Viscosity at 163° C. (mPa · s) | 1,600 | 1,350 | 900 | 1,825 | 1,625 | 2,150 | 1,800 |
| Viscosity at 177° C. (mPa · s) | 1,000 | 925 | 600 | 1,200 | 1,025 | 1,300 | 1,250 |
| RBSP (° C.) | 87 | 83 | 81 | 88 | 92 | 83 | 78 |
| SAFT (° C.) | 71 | 63 | 66 | 60 | 62 | 60 | 57 |
| 180° Peel to SS (g/cm) and mode of failure | 894 A | 822 A | 733 A | 1108 C | 858 ZA/C | 1108 A/C | 983 C |
| 180° Peel to HDPE (g/cm) and mode of failure | 626 A | 536 A | 554 A | 626 ZC | 322 ZA/C | 383 ZC | 679 A |
| Static Shear @ 60° C. to PE (time in min) | 120 | 18 | 36 | 5 | 18 | 10 | 2 |
| Static Shear @ 23° C. to SS (hours) | 180 | 50 | 30 | 5 | 37 | 48 | 5 |
| Adhesion to HDPE @ 4° C. | VERY GOOD | EXCELLENT | EXCELLENT | POOR | POOR | FAIR | VERY GOOD |

A = Adhesive Failure
C = Cohesive Failure
Z = Zippery Failure

The above results clearly demonstrate the superiority of Examples 1–3, versus the Comparative Examples 1–4. Important properties such as SAFT are significantly higher with the adhesives made by the teachings of this invention.

Now that the preferred embodiments of the present invention have been described in detail, various modifications and improvements thereon will become readily apparent to those skilled in the art. Accordingly, the spirit and scope of the present invention is to be only by the appended claims, and not by the foregoing disclosure.

What is claimed is:

1. A hot melt construction adhesive useful for the manufacture of disposable consumer articles, comprising:
   a blend of a linear styrene-butadiene A-B-A-B-A multi-block copolymer containing at least about 25 weight percent styrene and a linear styrene-isoprene A-B-A tri-block copolymer containing at least about 25 weight percent styrene;
   at least one tackifying resin; and
   at least one plasticizer;
wherein said hot melt construction adhesive possesses a viscosity no greater than about 25,000 mPa·s at about 140° C., a shear adhesion failure temperature of at least about 60° C., and a static shear time to failure of no less than about 25 hours at about 23° C.

2. The hot melt construction adhesive of claim 1 wherein the styrene-butadiene multi-block copolymer to styrene-isoprene tri-block copolymer ratio is from about 3:1 to about 1:3.

3. The hot melt construction adhesive of claim 1 wherein the styrene-butadiene multi-block copolymer contains from about 25 to about 50 weight percent styrene and possesses a melt flow index of from about 3 to about 50.

4. The hot melt construction adhesive of claim 1 wherein the styrene-isoprene-styrene tri-block copolymer contains from about 25 to about 50 weight percent styrene and possesses a melt flow index of from about 3 to about 50.

5. The hot melt construction adhesive of claim 1 wherein the linear styrene-isoprene tri-block copolymer contains less than about 25 weight percent diblocks.

6. The hot melt construction adhesive of claim 1 possessing a viscosity no greater than about 6,000 mPa·s at about 140° C., a shear adhesion failure temperature of at least about 65° C., and a static shear time to failure of no less than about 120 hours at about 23° C.

7. The hot melt construction adhesive of claim 1 wherein the tackifying resin represents from about 40 to about 65 parts by weight of the adhesive.

8. The hot melt construction adhesive of claim 1 wherein the tackifying resin is selected from the group consisting of aliphatic petroleum resins and the hydrogenated derivatives thereof, aromatic petroleum resins and the hydrogenated derivatives thereof, aliphatic/aromatic petroleum resins and the hydrogenated derivatives thereof, hydrocarbon resins, styrene resins, alpha-methyl styrene resins, polyterpene resins, copolymers and terpolymers of natural terpene resins, pentaerythritol esters of wood, gum, and tall-oil rosins, glycerol esters of wood, gum, and tall-oil rosins, mixed esters of rosins and mixtures thereof.

9. The hot melt construction adhesive of claim 7 wherein the plasticizer represents from about 10 to about 30 parts by weight of the adhesive.

10. The hot melt construction adhesive of claim 1 wherein the plasticizer is selected from the group consisting of napthenic oil, paraffinic oil, phthalate and adipate esters, oligomers of polypropylene, polybutenes, polyisoprene, hydrogenated polyisoprene and polybutadiene, benzoate esters, vegetable and animal oils and mixtures thereof.

11. The hot melt construction adhesive of claim 1 further comprising a wax.

12. The hot melt construction adhesive of claim 11 wherein the wax represents from 0 to about 10 parts by weight of the adhesive.

13. The hot melt construction adhesive of claim 11 wherein the wax is selected from a group consisting of paraffin wax, microcrystalline wax, Fischer-Tropsch wax, polyethylene wax, ethylene vinyl acetate wax, oxidized polyethylene wax, hydrogenated castor oil wax and derivatives thereof, polypropylene wax and mixtures thereof.

14. The hot melt construction adhesive of claim 1 further comprising a stabilizer.

15. The hot melt construction adhesive of claim 14 wherein the stabilizer represents from 0 to about 2.0 parts by weight of the adhesive.

16. The hot melt construction adhesive of claim 14 wherein the stabilizer is selected from the group consisting of a hindered phenol and a phosphite.

17. A hot melt construction adhesive useful for the manufacture of disposable consumer articles, comprising:
   about 5 parts to about 20 parts by weight of a linear styrene-butadiene A-BA-B-A-multi-block copolymer containing at least about 25 weight percent styrene;
   about 5 parts to about 20 parts by weight of a linear styrene-isoprene A-B-A tri-block copolymer containing at least about 25 weight percent styrene;
   about 40 to about 65 parts by weight of at least one tackifying resin;
   about 10 parts to about 30 parts by weight of at least one plasticizer;
   0 to about 10 parts by weight of at least one wax; and
   0 parts to about 2.0 parts by weight of at least one stabilizer;
wherein said hot melt construction adhesive possesses a viscosity no greater than about 6,000 mPa·s at about 140° C., a shear adhesion failure temperature of at least about 65° C., and a static shear time to failure of no less than about 25 hours at about 23° C.

18. A hot melt construction adhesive useful for the manufacture of disposable consumer articles, comprising:
   about 5 to about 15 parts by weight of a linear styrene-butadiene A-B-A-B-A multi-block copolymer containing from about 35 to about 45 weight percent styrene and possessing a melt flow index of from about 10 to about 20;
   about 5 to about 15 parts of a linear styrene-isoprene A-B-A tri-block copolymer containing from about 35 to about 45 weight percent styrene and possessing a melt flow index of from about 30 to about 50 and less than about 10 weight percent diblock content;
   about 40 to about 70 parts of a hydrogenated aliphatic-aromatic tackifying resin;
   about 10 to about 30 parts of a paraffinic oil;
   0 to about 10 parts of an oxidized polyethylene wax; and
   about 0.25 to about 2.0 parts by weight stabilizer wherein the hot melt construction adhesive possesses a viscosity of no greater than about 6,000 mPa·s at 140° C., a shear adhesion failure temperature of at least about 65° C., and a static shear time to failure of at least about 120 hours at about 23° C.

19. A process for bonding a first substrate comprising a polyolefin or nonwoven substrate to at least one second substrate comprising an elastic, polyolefin, foam, or nonwoven substrate, which comprises bonding the first substrate to the second substrate with the adhesive of claim 1.

* * * * *

UNITED STATES PATENT AND TRADEMARK OFFICE
CERTIFICATE OF CORRECTION

PATENT NO.    : 6,184,285 B1
DATED         : February 6, 2001
INVENTOR(S)   : Hatfield et al.

It is certified that error appears in the above-identified patent and that said Letters Patent is hereby corrected as shown below:

<u>Column 16,</u>
Line 18, delete "A-BA-B-A" and insert therefor -- A-B-A-B-A --.

Signed and Sealed this

Twenty-fourth Day of June, 2003

JAMES E. ROGAN
*Director of the United States Patent and Trademark Office*